United States Patent
Venkatesan et al.

(10) Patent No.: US 6,671,407 B1
(45) Date of Patent: Dec. 30, 2003

(54) SYSTEM AND METHOD FOR HASHING DIGITAL IMAGES

(75) Inventors: Ramarathnam Venkatesan, Redmond, WA (US); Say-Ming William Koon, Wilmington, MA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/421,986

(22) Filed: Oct. 19, 1999

(51) Int. Cl.[7] .................................................. G06K 9/36
(52) U.S. Cl. ........................ 382/232; 382/239; 382/248; 382/251
(58) Field of Search .................................. 382/232, 248, 382/251, 239, 224; 710/73; 711/164; 707/6; 345/582, 427, 606

(56) References Cited

U.S. PATENT DOCUMENTS

| | | | |
|---|---|---|---|
| 5,465,353 A | | 11/1995 | Hull et al. .................... 395/600 |
| 5,613,004 A | | 3/1997 | Cooperman et al. .......... 380/28 |
| 5,664,016 A | * | 9/1997 | Preneel et al. ................. 380/28 |
| 5,689,639 A | * | 11/1997 | Schwarz ................ 395/200.01 |
| 5,809,498 A | * | 9/1998 | Lopresti et al. ................. 707/6 |
| 6,101,602 A | * | 8/2000 | Fridrich ....................... 713/176 |
| 6,363,463 B1 | * | 3/2002 | Mattison ..................... 711/164 |

OTHER PUBLICATIONS

Chang et al., "RIME: A Replicated Image Detector for the World–Wide Web", 10 pages. pp. 56–67, Proc. of the SPIE, vol. 352, 11/98.

* cited by examiner

Primary Examiner—Anh Hong Do
(74) Attorney, Agent, or Firm—Lee & Hayes, PLLC

(57) ABSTRACT

A system has an image store, a digital hashing unit, and a watermark encoder. A digital image hashing unit computes a hash value representative of a digital image in such a manner that visually similar images hash to the same hash value and visually distinct images hash to different values. The hash value is stored in an image hash table and is associated via the table with the original image. This image hash table can be used to index the image storage. A watermark encoder computes a watermark based on the hash value and a secret. Using both values renders the watermark resistant to BORE (Break Once, Run Everywhere) attacks because even if the global watermark secret is discovered, an attacker still needs the hash value of each image to successfully attack the image. The system can be configured to police the Internet to detect pirated copies. The system randomly collects images from remote Web sites and hashes the images using the same hashing function. The system then compares the image hashes to hashes of the original images. If the hashes match, the collected image is suspected as being a copy of the original.

19 Claims, 4 Drawing Sheets

SYSTEM AND METHOD FOR HASHING DIGITAL IMAGES

TECHNICAL FIELD

This invention relates to systems and methods for hashing digital bit streams such as digital images. This invention further relates to database systems and methods that utilize the hashing techniques for indexing bit streams and protecting copyrights in the bit streams.

BACKGROUND

Digital images offer many advantages over conventional media in terms of image quality and ease of transmission. However, digital images consume large amounts of memory space. With the ever increasing popularity of the Internet, digital images have become a mainstay ingredient of the Web experience, buoyed by such advances as the increasing speed at which data is carried over the Internet and improvements in browser technology for rendering such images. Everyday, numerous digital images are added to Web sites around the world.

As image databases grow, the needs for indexing them and protecting copyrights in the images are becoming increasingly important. The next generation of database management software will need to accommodate solutions for fast and efficient indexing of digital images and protection of copyrights in those digital images.

A hash function is one probable solution to the image indexing and copyright protection problem. Hash functions are used in many areas such as database management, querying, cryptography, and many other fields involving large amounts of raw data. A hash function maps large unstructured raw data into relatively short, structured identifiers (the identifiers are also referred to as "hash values" or simply "hash"). By introducing structure and order into raw data, the hash function drastically reduces the size of the raw data into short identifiers. It simplifies many data management issues and reduces the computational resources needed for accessing large databases.

Thus, one property of a good hash function is the ability to produce small-size hash values. Searching and sorting can be done much more efficiently on smaller identifiers as compared to the large raw data. For example, smaller identifiers can be more easily sorted and searched using standard methods. Thus, hashing generally yields greater benefits when smaller hash values are used.

Unfortunately, there is a point at which hash values become too small and begin to lose the desirable quality of uniquely representing a large mass of data items. That is, as the size of hash values decreases, it is increasingly likely that more than one distinct raw data can be mapped into the same hash value, an occurrence referred to as "collision". Mathematically, for A alphabets of each hash digit and a hash value length l, an upper bound of all possible hash values is $A^l$. If the number of distinct raw data are larger than this upper bound, collision will occur.

Accordingly, another property of a good hash function is to minimize the probability of collision. However, if considerable gain in the length of the hash values can be achieved, it is sometimes justified to tolerate collision. The length of the hash value is thus a trade off with probability of collision. A good hash function should minimize both the probability of collision and the length of the hash values. This is a concern for design of both hash functions in compilers and message authentication codes (MACs) in cryptographic applications.

Good hash functions have long existed for many kinds of digital data. These functions have good characteristics and are well understood. The idea of a hash function for image database management is very useful and potentially can be used in identifying images for data retrieval and copyrights protection. Unfortunately, while there are many good existing functions, digital images present a unique set of challenges not experienced in other digital data, primarily due to the unique fact that images are subject to evaluation by human observers. A slight cropping or shifting of an image does not make much difference to the human eye, but such changes appear very differently in the digital domain. Thus, when using conventional hashing functions, a shifted version of an image generates a very different hash value as compared to that of the original image, even though the images are essentially identical in appearance. Another example is the deletion of one line from an image. Most people will not recognize this deletion in the image itself, yet the digital data is altered significantly if viewed in the data domain.

Human eyes are rather tolerant of certain changes in images. For instance, human eyes are much less sensitive to high frequency components of an image than low frequency components. In addition, the average (i.e., DC component) is interpreted by our eyes as brightness of an image and it can be changed within a range and cause only minimal visible difference to the observer. Our eyes would also be unable to catch small geometric deformation in most images.

Many of these characteristics of the human visual system can be used advantageously in the delivery and presentation of digital images. For instance, such characteristics enable compression schemes, like JPEG, to compress images with good results, even though some of the image data may be lost or go unused. There are many image restoration/enhancement algorithms available today that are specially tuned to the human visual system. Commercial photo editing systems often include such algorithms.

At the same time, these characteristics of the human visual system can be exploited for illegal or unscrupulous purposes. For example, a pirate may use advanced image processing techniques to remove copyright notices or embedded watermarks from an image without visually altering the image. Such malicious changes to the image are referred to as "attacks", and result in changes at the data domain. Unfortunately, the user is unable to perceive these changes, allowing the pirate to successfully distribute unauthorized copies in an unlawful manner. Traditional hash functions are of little help because the original image and pirated copy hash to very different hash values, even though the images appear the same.

Accordingly, there is a need for a hash function for digital images that allows slight changes to the image which are tolerable or undetectable to the human eye, yet do not result in a different hash value. For an image hash function to be useful, it should accommodate the characteristics of the human visual system and withstand various image manipulation processes common to today's digital image processing. A good image hash function should generate the same unique identifier even though some forms of attacks have been done to the original image, given that the altered image is reasonably similar to a human observer when comparing with the original image. However, if the modified image is visually different or the attacks cause irritation to the observers, the hash function should recognize such degree of changes and produce a different hash value from the original image.

SUMMARY

This invention concerns a system and method for hashing digital images in a way that allows modest changes to an image, which may or may not be detectable to the human eye, yet does not result in different hash values for the original and modified images.

According to one implementation, a system stores original images in a database. An image hashing unit hashes individual images to produce hash values that uniquely represent the images. The image hashing unit implements a hashing function H, which takes an image I and an optional secret random string as input, and outputs a hash value X according to the following properties:

1. For any image $I_i$, the hash of the image, $H(I_i)$, is approximately random among binary strings of equal length.
2. For two distinct images, $I_1$ and $I_2$ the hash value of the first image, $H(I_1)$, is approximately independent of the hash value of the second image, $H(I_2)$, in that given $H(I_1)$, one cannot predict $H(I_2)$ without knowing a secret key used to produce $H(I_1)$.
3. If two images $I_2$ and $I_2$ are visually the same or similar, the hash value of the first image, $H(I_1)$, should equal the hash value of the second image, $H(I_2)$.

The hash value is stored in an image hash table and is associated via the table with the original image I from which the hash is computed. This image hash table can be used to index the image storage.

The processing system also has a watermark encoder to watermark individual images. The watermark encoder computes a watermark based on the hash value X and a secret W. Using both values effectively produces unique secrets for each individual image. Thus, even if the global watermark secret is discovered, the attacker still needs the hash value of each image to successfully attack the image. As a result, the system is resistant to BORE (Break Once, Run Everywhere) attacks, thereby providing additional safeguards to the images.

The watermark encoder encodes the watermark into the original image I to produce a watermarked image I'. The system may store and/or distribute the watermarked image.

According to an aspect of this invention, the system can be configured to search over the Internet to detect pirated copies. The system randomly collects images from remote Web sites and hashes the images using the same hashing function H. The system then compares the image hashes to hashes of the original images. If the hashes match, the collected image is suspected as being a copy of the original.

BRIEF DESCRIPTION OF THE DRAWINGS

The same numbers are used throughout the drawings to reference like elements and features.

DETAILED DESCRIPTION

This invention is described below as a technique for hashing digital images. Thus, the described hashing techniques are particularly tailored to accommodate characteristics of the human visual system and withstand various image manipulation processes common to today's digital image processing. However, the invention is not limited in its application to digital images. Rather, the described techniques can also be applied to other sampled or digitized media streams such as digitized audio streams.

The described hashing techniques generate the same unique identifier even though some forms of attacks have been done to the original image, given that the altered image is reasonably similar to a human observer when comparing the altered image with the original image. However, if the altered image is visually different or the attacks cause irritation to the observers, the hash function recognizes such degree of changes and produces a different hash value from the original image.

The hash function implemented by various systems and methods described herein is denoted as H. Given an input image I, the hash function H produces a short binary string X, as follows:

$$H(I)=X$$

The hash function H has the following properties:

4. For any image $I_i$, the hash of the image, $H(I_i)$, is approximately random among binary strings of equal length.
5. For two distinct images, $I_1$ and $I_2$, the hash value of the first image, $H(I_1)$, is approximately independent of the hash value of the second image, $H(I_2)$, in that given $H(I_1)$, one cannot predict $H(I_2)$ without knowing a secret key used to produce $H(I_1)$.
6. If two images $I_1$ and $I_2$ are visually the same or similar, the hash value of the first image, $H(I_1)$, should equal the hash value of the second image, $H(I_2)$.

A special case of the third property is where an original image is attacked to remove the watermark or copyright notice. In this case, suppose the original image $I_O$ is modified to include a watermark, thus producing a watermarked image $I_{WM}$. Using property three, the images are visually identical and hence, $H(I_O)=H(I_{WM})$. Now, suppose that the watermarked image is attacked using digital image processing techniques to remove the watermark and produce a pirate image $I_P$, which is visually identical to the original image $I_O$ and the watermarked image $I_{WM}$. In this case, the hash values are also the same, i.e., $H(I_{WM})=H(I_P)$.

One exemplary implementation of the hashing function H is described below in more detail. In addition, exemplary implementations of the hashing technique in various systems and methods are described below, beginning with an architecture for electronic distribution of digital images over a network, such as the Internet.

System Architecture

Figure 1:
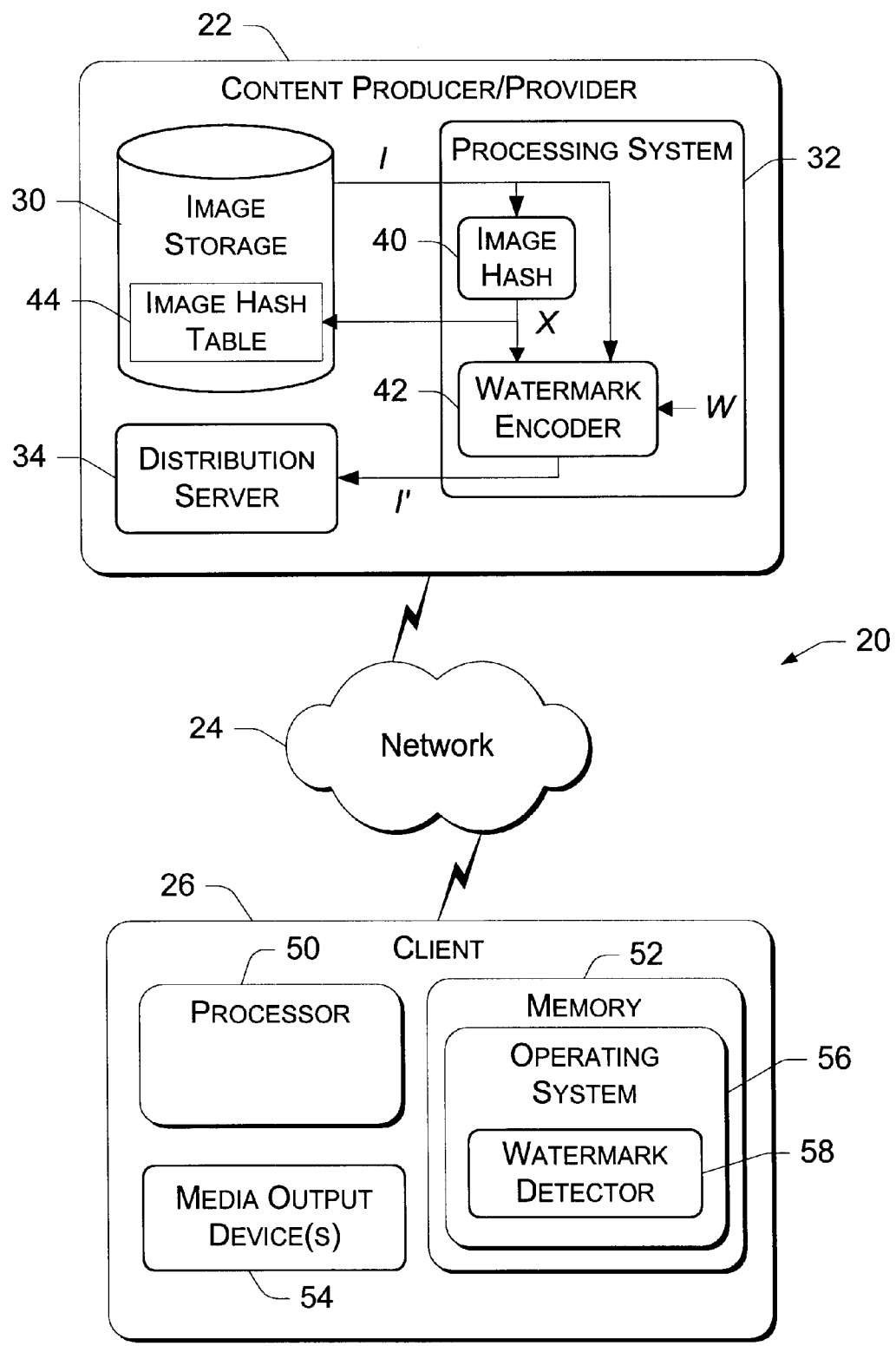
FIG. 1 is a block diagram of an image distribution system in which a content producer/provider hashes and watermarks digital images and subsequently distributes them to a client over a network.

FIG. 1 shows an image distribution system 20 having a content producer/provider 22 that produces digital images and/or distributes the digital images over a network 24 to a client 26. The content producer/provider 22 has an image storage 30 to store digital images, a processing system 32 to process the images prior to distribution, and a distribution server 34 to distribute the images over the network 24 (e.g., Internet, LAN, WAN, etc.). The server 34 may be further configured to compress and/or encrypt the images using conventional compression and encryption techniques prior to distributing the content over the network 24.

The processing system 32 has an image hashing unit 40 that hashes individual images to produce hash values that uniquely represent the images. The image hashing unit 40 implements the hashing function H, which takes an image I as input, and outputs a hash value X according to the properties described above. The hash value is stored in an image hash table 44 in storage 30 and is associated via the table 44 with the original image I from which the hash is computed. This image hash table 44 can be used to index the image storage 30.

The processing system 32 also has a watermark encoder 42 to watermark individual images. A watermark is an array of bits generated using known cryptographic techniques and embedded into a digital image, without affecting the appearance of the image. The watermark encoder 42 receives the hash value X, and computes a watermark based, in part, on the hash value X and a secret W. The watermark encoder 42 encodes the watermark into the original image I to produce a watermarked image I'. The system 32 may store the watermarked image I' in the image storage 30 and/or passed to the distribution server 34 for distribution over the network 24 to the client 26.

An advantage of computing the watermark based on the hash value X is that it adds security on a per image basis. Normally, a single watermark based on the watermark secret W is globally applied to all images in the storage 30. In contrast, image hash unit creates separate and distinct hash values X for each of the images. The watermark encoder 42 then uses these values in conjunction with the watermark secret W to effectively produce unique secrets for each individual image. Thus, even if the watermark secret is discovered, the attacker still needs the hash value of each image to successfully attack the image. As a result, the system is resistant to BORE (Break Once, Run Everywhere) attacks, thereby providing additional safeguards to the images.

It is noted that the image hashing unit 40 and watermark encoder 42 may be implemented in software or firmware. These components may be constructed as part of a processing system, incorporated into other applications or an operating system, or formed as separate standalone modules. The content producer/provider 22 may be implemented in many ways, including as one or more server computers configured to store, process, and distribute digital images.

The client 26 is equipped with a processor 50, a memory 52, and one or more media output devices 54. The processor 50 runs various tools to process the digital images, such as tools to decompress the images, decrypt the date, and/or apply controls (size, rotation, etc.). The memory 52 stores an operating system 56, such as a Windows brand operating system from Microsoft Corporation, which executes on the processor. The client 26 may be embodied in a many different ways, including a computer, a handheld entertainment device, a set-top box, a television, and so forth.

The operating system 56, or any trusted software or hardware on the client machine, may implement a client-side watermark detector 58 to detect the watermark in the digital images. If the watermarks are present, the client is assured that the content is original and can be played. Absence of the watermark indicates that the image is a pirated copy of the original. The operating system 56 and/or processor 50 may be configured to enforce certain rules imposed by the content producer/provider (or copyright owner). For instance, the operating system and/or processor may be configured to reject fake or copied images that do not possess a watermark.

Image Hash Unit

Figure 2:
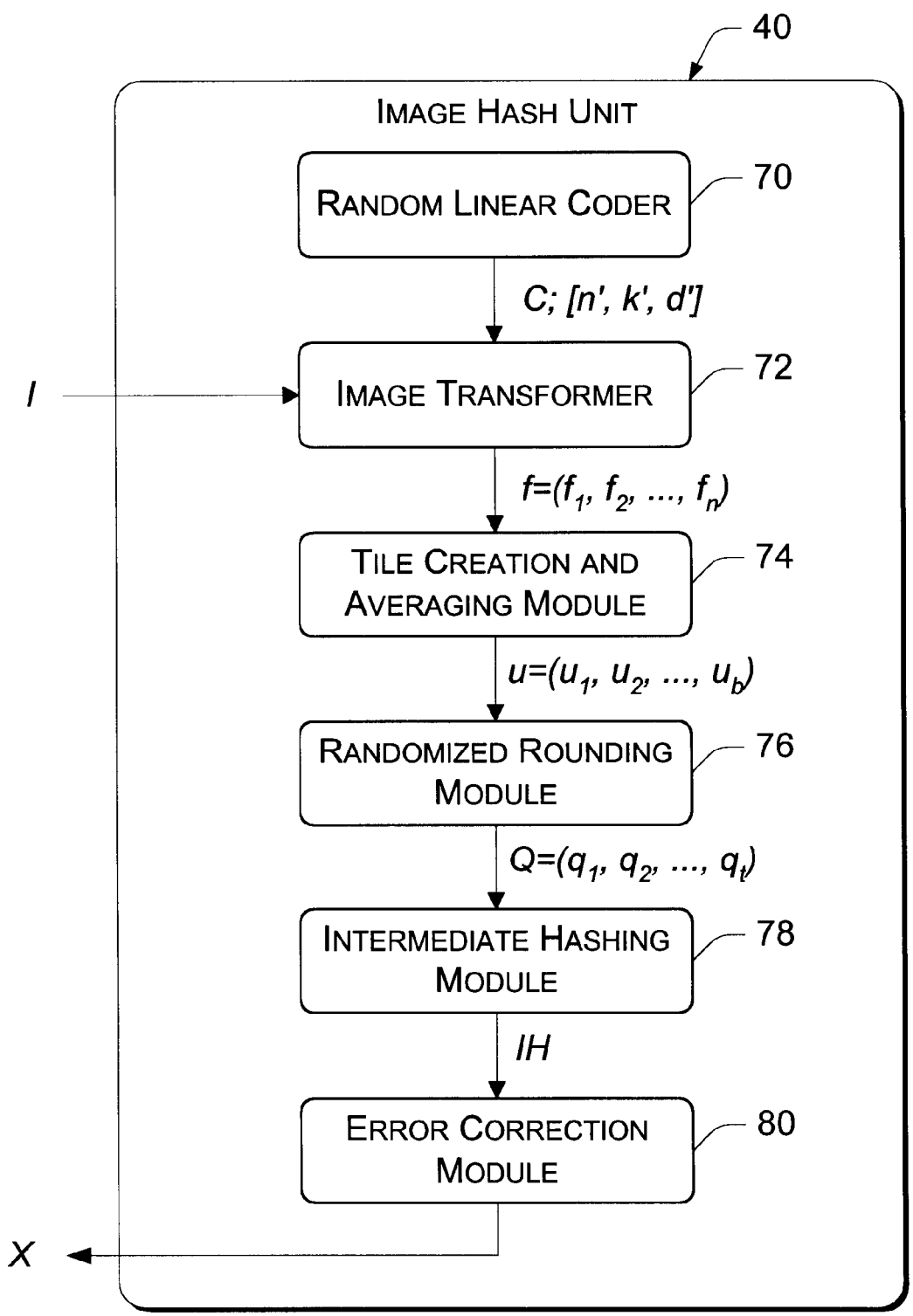
FIG. 2 is a functional block diagram of an image hash unit implemented at the content producer/provider of FIG. 1 to hash the digital images.

FIG. 2 shows the image hash unit 40 in more detail. The image hash unit 40 includes a random linear coder 70, an image transformer 72, a tile creation and averaging module 74, a randomized rounding module 76, an intermediate hashing module 78, and an error correction module 80. These components are preferably implemented in software, although some or all of the components may be implemented in firmware or hardware.

The random linear coder 70 selects a random linear code C that is used later in the processing by the error correction module. The selection is performed once during initialization and the linear code C is used for all images. The linear code C has three selectable parameters n', k', and d', where n' represents a length of a random string, k' represents a length of the original message, and k' represents a Hamming distance. The linear code C has the following properties:

$$C=\{B:AB=0 \bmod 2\}$$

where A is an m' x n' matrix (m' is computed from n', k', and d') in which each entry is chosen randomly from a set of values $\{0, 1\}$. B is an n' x 1 matrix containing an n'-bit array generated by the pseudo-random number generator. As an example, the set of parameters (n', k', d') equal (32, 15, 5).

The image transformer 72 receives an original image I and computes a transformation of the image using a transform function $f$, where $f=(f_1, f_2, \ldots, f_n)$. The transformer 72 may use one of many conventional transforms, such as a Fourier transform, a wavelet transform, and a DCT (Discrete Cosine transform ) transform. As one exemplary implementation, the image transformer 72 uses a wavelet transform to decompose the image into three levels or subbands: a coarse subband, a high-low subband, and a low-high subband.

The tile creation and averaging module 74 randomly divides the image transform image into multiple tiles t, where each tile contains data for multiple pixels in the image. Two possible techniques for constructing the tiles are (1) forming non-overlapping rectangular tiles and (2) creating overlapping rectangular tiles.

Figure 3:
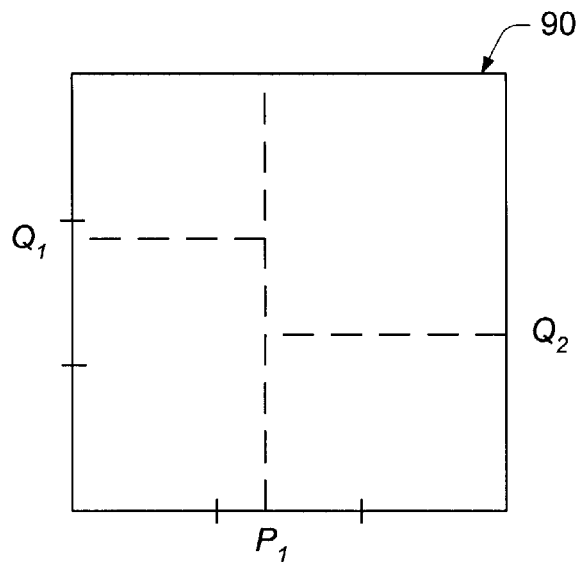
FIG. 3 is a diagrammatic illustration of a process of dividing an image transform into multiple non-overlapping tiles.

FIG. 3 illustrates the process of forming non-overlapping tiles. Given image transform 90, the tile creation module 74 randomly picks a point $P_1$ somewhere between one-third and two-thirds of the base and divides the image transform 90 into side-by-side rectangles. The module 74 then randomly selects a point $Q_1$ somewhere between one-third to two-thirds of the height and divides the left-side rectangle. One can use any suitable distribution that splits the image into approximately equal portions here. Similarly, the module 74 randomly selects a point $Q_2$ somewhere between one-third to two-thirds of the height and divides the right-side rectangle. This process is repeated for each of the subrectangles until a predetermined number of tiles is created.

Figure 4:
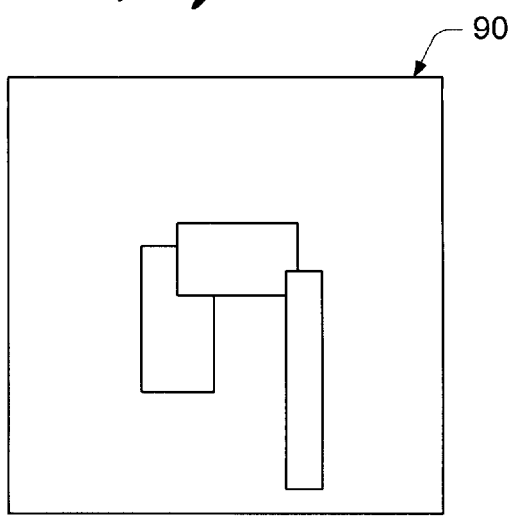
FIG. 4 is a diagrammatic illustration of a process of dividing an image transform into multiple overlapping tiles.

FIG. 4 illustrates the process of forming overlapping tiles. Given the image transform 90, the tile creation module 74 randomly draws a series of rectangles over the space, until the predetermined number of tiles is created.

In the continuing exemplary implementation in which a wavelet transform is used, each subband-coarse, low-high, and high-low-is divided into 64 small rectangles with random sizes. The coarse subband is divided using the non-overlapping process of FIG. 3, whereas the high and high-high subbands are divided using the overlapping process of FIG. 4. This produces 192 tiles for an image.

After tile creation, the tile creation and averaging module 74 computes an average of each tile t. In the continuing example involving a wavelet transform, suppose that a tile of the transformed image has data for pixels $g_1, g_2, \ldots, g_N$. The tile creation and averaging module 74 produces an average $\mu$ for each tile t, as follows:

$$u_i = \frac{\sum_{j=1}^{N} g_j}{N}$$

In high and high-high subbands, the average may be zero. In those cases, the variance is computed instead of the average, as follows:

$$V^2 = \frac{\sum_{j=1}^{N} g_j^2}{N}$$

For the coarse subband, the module 74 quantizes the averages of the tiles into eight (an example value) distinct levels based on an absolute value of the tile average. The maximum value for the coarse subband is 2040 (i.e., 255*8) and this value is divided by eight to produce eight different quantization levels. A total of 126 values are computed for the 64 random tiles and their combinations.

As for the high-low and low-high subbands, where the average values are guaranteed to be zero, the variances are computed and fitted by an exponential distribution so that the values fall into approximately eight different levels. To reduce the effect from exclusion/inclusion of an edge in the tile due to shifting of an image, a window function is used around the tile to reduce the effect of edges.

The tile creation and averaging module 74 outputs an average vector $\mu=(\mu_1, \mu_2, \ldots, \mu_t)$ having averages for the t tiles in the image.

With continuing reference to FIG. 2, the randomized rounding module 76 receives the average vector and computes, for each subband, the average of all the tiles' variances. Using this average, the rounding module 76 creates an exponential distribution and generates eight distinct quantization levels based on this distribution. Each quantization level has a probability mass of one-eighth, meaning that for a random tile the results from rounding will be uniformly distributed across the quantization levels. The quantization levels are represented as $A_0$ to $A_7$. The rounding module 76 rounds each of the averages $\mu_i$ for each tile t to one of the eight quantization levels.

Figure 5:
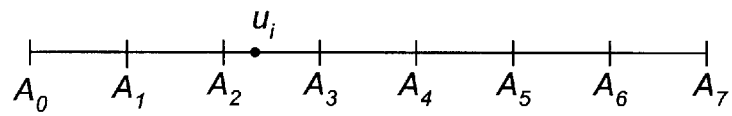
FIG. 5 is a diagrammatic illustration of quantization points to demonstrate a process of rounding tile averages to one of the points.

FIG. 5 illustrates the rounding process. Suppose that an average $\mu_i$ falls between quantization levels $A_2$ and $A_3$. The rounding module 76 tends to favor rounding the average $\mu$ toward the closer of the two quantization levels, which in this case is level $A_2$. But, the rounding module 76 also introduces some randomness to make it more difficult for an attacker to predict the outcome of the rounding. The randomness essentially imposes a coin flip strategy in which the mathematical expectation of the outcome after the rounding is equal to the original value of the quantity being rounded.

Stated alternatively, the mathematical expectation of the outcome should be equal to a continuous function of the value being rounded. Also one may use a buffered rounding strategy where the given quantity ($\mu_i$) is rounded to the nearest number A2 or A, if the distance to the nearest number is smaller than some pre-determined bound. As a result, the rounding module 76 effectively rounds the average $\mu_i$ toward one of the two quantization levels according to a coin flip that is biased slightly toward rounding to the nearest of the two quantization levels. It is further noted that the quantization levels are generated in the first place with a goal of making the expected value of the rounding to be equal to the original value, and any small changes in the given quantity will result in small changes in the expected value of the final rounded output.

Mathematically, let $\rho$ represent a distance parameter involving $\mu_i$ and the two nearest quantization levels $A_2$ and $A_3$. By this we mean $$\rho=(\mu_i-A_2)/(A_3-A_2); \text{ or}$$

Now we flip a coin which has bias $\rho$ of getting heads and 1-$\rho$ for tails. Then if we get a head we round $\mu_i$ to A3. Otherwise, we round it to A2. The distance parameter $\rho$ generates a bias towards the closer value while the random number r provides some randomness to make it more difficult for the attacker to predict the outcome.

The rounded values are mapped into k-bit binary strings $q_1, q_2, \ldots, q_t$, one string for each tile t. In our continuing example, the rounded values are mapped into 3-bit binary strings representative of the quantization points $A_0 \ldots -A_7$. A value $\mu_i$ that rounds to $A_0$ is mapped to binary string "000", a value $\mu_i$ that rounds to $A_1$ is mapped to "001", a value $\mu_i$ that rounds to $A_2$ is mapped to "010", and so on. As noted above, the points $A_0-A_7$ are chosen so that for a random tile, the rounding steps yields uniformly distributed 3-bit binary strings. The k-bit binary strings are appended together to form a composite value Q, which is output by the randomized rounding module 76.

The rounding sub-process provides particular advantages for the image hashing process. The rounded values are used instead of the precise averages in later computation of the hash values. In this manner, slight modifications can be made to an image without changing the hash value for the image. That is, an attacker can make minor changes, such as removing a watermark, that modify the averages $\mu_i$ for some or all of the tiles. Without rounding and the subsequent error-correction sections, these changes would result in a different hash value. However, with the rounding process and the error correction, these changes do not carry through to the resulting rounded values and hence, the hash value for the two images remains the same.

The intermediate hash module 78 receives the composite value Q and produces an intermediate hash IH with the following properties:

1. For two visually distinct images $I_1$ and $I_2$, the intermediate hash values differ approximately 60% of the time.
2. For two visually similar images I1 and I2, the intermediate bash values agree in all but approximately 20% of the time.

The above numbers (60% 20%) are indicative of the exemplary implementation and can vary depending on the characteristics of the digitized stream.

In the continuing example, the intermediate hashing module 78 implements a first order Reed-Muller error correction code decoder. Such decoders are well known and other error correcting code decoders may be used (See, e.g., NJA Sloane and Mc Williams, "Theory of Error Correcting Codes", North Holland). The Reed-Muller decoder (or other suitable decoder) is modified, however, to work with a distance function we call an exponential pseudo-norm. Given a vector $v=(v_1, v_2, \ldots, v_l)$, the pseudo-random norm is:

$$norm(v) = \sum_{i=1}^{l} C^{|v_i|}$$

It is noted that the image hash unit 40 does not employ a complementary encoder, but only the decoder.

The error correction module 80 receives the intermediate hash IH and reduces the hash size and number of error occurrences. In our continuing example, the error correction module 80 extracts a subset of bits from the intermediate hash IH. The subset of bits is chosen so that approximately one-half of the bits are extracted from the coarse subbands and one-fourth of the bits are extracted from each of the two high frequency subbands. There are hundreds of bits in the intermediate hash IH and the extracted subset of bits typically numbers less than one hundred.

From the subset, the error correction module 80 further extracts a reduced set of bits, such as 32 bits. This reduced set of bits is then processed using a list-decoding process into a small list $\{X_1, X_2, \ldots, X_r\}$, where r is small. List-decoding is well known. For a very brief discussion on list-decoding, the reader is directed to the last section of L. A. Levine, "One-Way Functions and Pseudo-Random Generators", Combinatorica 7, 1987, pgs. 357–363, and to P. Elias, "Personal Communication to L. A. Levin", 1988. Also see the following references:

Sudan, Madhu; *Proceedings of the 37th Annual IEEE Symposium on Foundations of Computer Science;* "Maximum Likelihood Decoding of Reed Solomon Codes"; 1996 (a more recent version of this paper, entitled "Decoding Reed Solomon Codes Beyond the Error-Correction Bound", is available by request from MIT Laboratory of Computer Sciences, and is available on the Internet at the time of this writing at "http://theory.lcs.mit.edu/~madhu/papers/reedsolomon.ps".

*Journal of Complexity*, Special issue dedicated to Shmuel Winograd, 13(1): 180–193, March 1997

One word is selected from this list using image parameters/semantics to produce a final hash value X. Specifically, a word is selected using a maximum likelihood method. In the example, the resultant hash value is 32 bits. However, if this value results in a higher probability of collision, a longer hash value may be obtained by running the process twice to produce two 32-bit values or by increasing the parameters of the linear coding unit 70 to produce larger encoded messages.

Exemplary Contexts

The image hashing process described above, and implemented in the image hashing unit 40, can be used in many ways and in a number of contexts. For instance, the image hashing process can be used as an indexing system for a large database of images. In this context, the image hashes X are stored in an indexing table 44 (FIG. 1) and used to rapidly index the associated images in the image storage 30.

Another exemplary context is to use the image hashing process as a way to police search over the Internet to detect pirated copies. Generally, this is done by randomly collecting images, hashing them, and comparing the image hashes to hashes of the original images. If the hashes match, the collected image is suspected as being a copy of the original.

Figure 6:
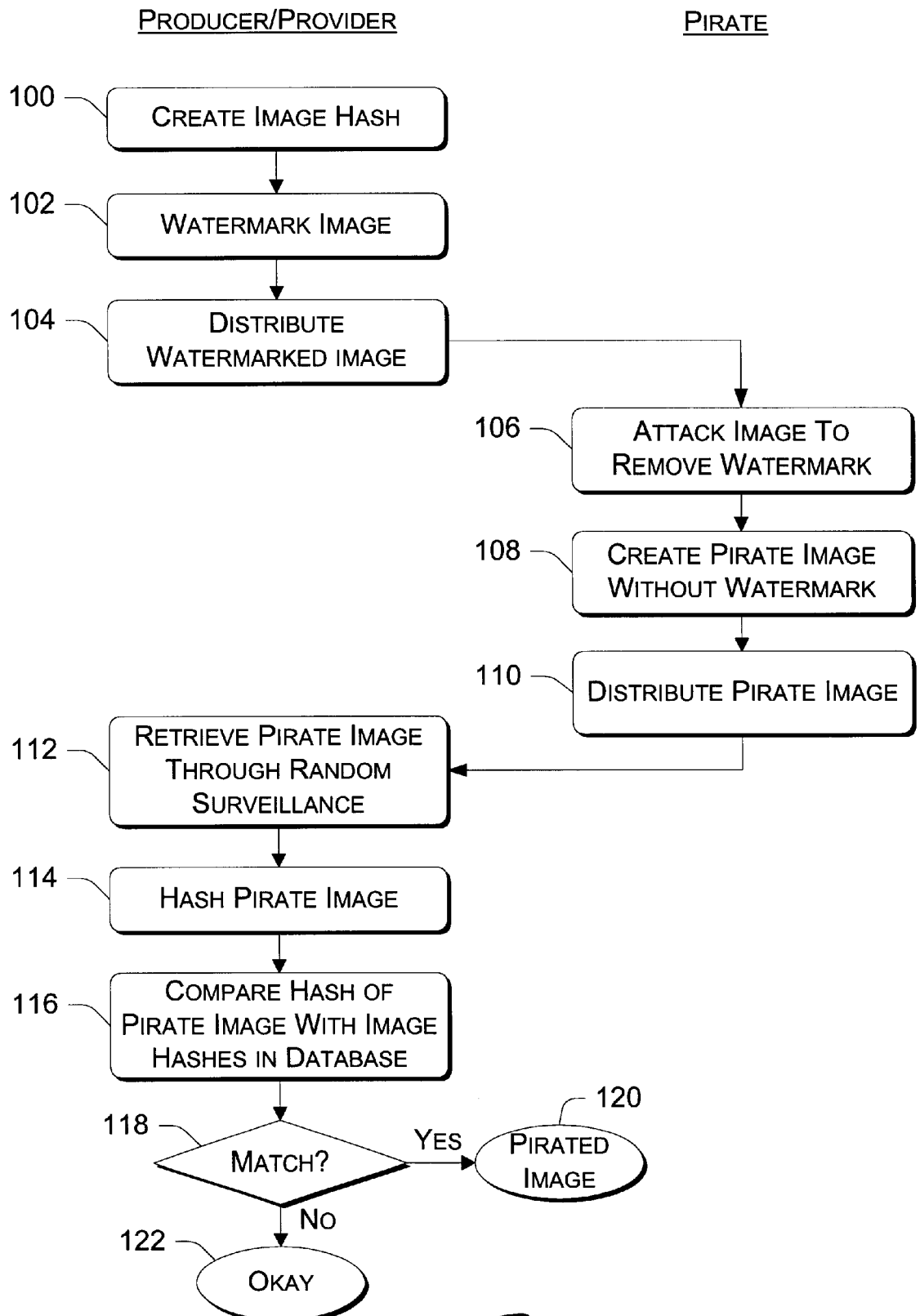
FIG. 6 is a flow diagram showing a method for distributing watermarked digital images over a network and through surveillance, detecting pirated versions of the digital images using a hash compare operation.

FIG. 6 illustrates a detailed process of distributing watermarked digital images and through surveillance, detecting pirated versions of the digital images using the image hash process. The process is implemented primarily in software, although aspects may be implemented using hardware and firmware. The process is further described with reference to FIG. 1.

At step 100, the processing system 32 of the content producer/provider 22 retrieves an image from the image store 30 and computes an image hash X associated with the image. The image hash X is stored in the image hash table 44 and associated with the original image. The processing system 32 then watermarks the image using the image hash X and a secret key W to produce the watermark (step 102). This combination of secrets makes the watermark unique to each image, rather than global to all images. The watermarked images may optionally be stored in the image storage 30.

At step 104, the distribution server 34 distributes the watermarked image I' over the network 24 to a client 26. In this case, suppose the client is a pirate who intends to attack the image and remove the watermark (step 106). Through the attacks, the pirate is able to produce a pirated version of the image that is visually identical or very similar, but without the watermark (step 108). The pirate then redistributes the pirated version for illicit gain (step 110).

Through standard surveillance practices, the original content producer/provider 22 routinely and randomly gathers images from various Web sites. In a routine sweep, the content producer/provider 22 collects the pirated version along with other images (step 112). The content producer/provider 22 uses the image hash unit 40 to compute image hashes of each collected image (step 114). The content producer/provider 22 then compares each image hash of the collected images with image hashes stored in the image hash table 44 to evaluate whether any match occurs (step 116). If the image hash of a collected image matches a stored image hash (i.e., the "yes" branch from step 118), the image is detected as potentially being a pirated version (step 120). Conversely, if no match occurs, the collected versions are not considered duplicate or altered versions of the original images (step 122).

Conclusion

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A computer-implemented method for hashing an image, comprising:

transforming the image into an image transform;

randomly dividing the image transform into multiple tiles, each tile containing pixel data for multiple pixels;

averaging, for each of the tiles, the pixel data to produce corresponding tile averages;

generating, based in part on the tile averages, an exponential distribution having multiple distinct quantization levels;

randomly rounding each of the tile averages to one of the quantization levels to produce rounded values; and hashing a composite of the rounded values.

2. A computer-implemented method as recited in claim 1, wherein the transforming is performed according to a transformation function selected from a group of functions comprising Fourier transform, a wavelet transform, and a DCT transform.

3. A computer-implemented method as recited in claim 1, wherein the transforming comprises decomposing the Image into multiple wavelet subbands.

4. A computer-implemented method as recited in claim 1, wherein the dividing comprises forming non-overlapping rectangular tiles.

5. A computer-implemented method as recited in claim 1, wherein the dividing comprises forming overlapping rectangular tiles.

6. A computer-implemented method as recited in claim 1, wherein the averaging comprises computing a variance of the pixel data in cases where the tile average is approximately zero.

7. A computer-implemented method as recited in claim 1, wherein the rounding comprises rounding toward a closer one of the quantization levels, but at a randomness that suggests an equal probability of rounding toward a farther one of the quantization levels.

8. A computer-implemented method as recited in claim 1, wherein the hashing comprises processing the rounded values to produce an intermediate hash value such that for visually distinct images, the intermediate hash values differ approximately 60% of the time and for visually similar images, the intermediate hash values agree in all but approximately 20% of the time.

9. A computer-implemented method as recited in claim 1, wherein the hashing comprises processing the rounded values using a Reed-Muller error correction code decoder.

10. A computer-implemented method as recited in claim 1, wherein the hashing comprises processing the rounded values using a Reed-Muller error correction code decoder with an exponential pseudo-random norm.

11. A computer-implemented method as recited in claim 1, wherein the hashing produces an intermediate hash value, further comprising reducing a size of the intermediate hash value via an error correction process.

12. A computer-implemented hashing method, comprising:

computing a hash value representative of a digital Image such that visually distinct images result in hash values that are approximately independent of one another and visually similar images result in identical hash values;

storing the hash value in relationship with the digital image;

watermarking the digital Image using, In part, the hash value to produce a watermarked image;

subsequently distributing the watermarked image over a network;

collecting an image from a remote site on the network;

computing a hash value of the image collected from the remote site;

comparing the hash value of the collected image with the stored hash value; and identifying the collected image as a pirated version of the digital image if the hash values match.

13. A digital image hash system, comprising:

means for transforming an image into an image transform;

means for randomly dividing the image transform into multiple files, each tile containing pixel data for multiple pixels;

means for averaging, for each of the tiles, the pixel data to produce corresponding tile averages;

means for generating, based in part on the tile averages, an exponential distribution having multiple distinct quantization levels;

means for randomly rounding each of the tile averages to one of the quantization levels to produce rounded values; and means for hashing a composite of the rounded values.

14. A computer-readable medium comprising computer-executable instructions, which when executed on a processor, direct a computer to:

transform an image into an image transform;

divide the image transform into multiple tiles, each tile containing pixel data for multiple pixels;

average, for each of the tiles, the pixel data to produce corresponding tile averages;

generate, based in part on the tile averages, an exponential distribution having multiple distinct quantization levels;

randomly round each of the tile averages to one of the quantization levels to produce rounded values; and hash a composite of the rounded values.

15. A computer-readable medium as recited in claim 14, further comprising computer-executable instructions, which when executed on a processor, direct a computer to transform an image into an image transform by decomposing the image into multiple wavelet subbands.

16. A computer-readable medium as recited in claim 14, further comprising computer-executable instructions, which when executed on a processor, direct a computer to divide the image transform into multiple non-overlapping rectangular tiles.

17. A computer-readable medium as recited in claim 14, further comprising computer-executable instructions, which when executed on a processor, direct a computer to divide the image transform into multiple overlapping rectangular tiles.

18. A computer-readable medium as recited in claim 14, further comprising computer-executable instructions, which when executed on a processor, direct a computer to average, for each of the tiles, the pixel data to produce corresponding tile averages, wherein the averaging comprises computing a variance of the pixel data in cases where the tile average is approximately zero.

19. A computer-readable medium as recited in claim 14, further comprising computer-executable instructions, which when executed on a processor, direct a computer to randomly round each of the tile averages, wherein the rounding comprises rounding toward a closer one of the quantization levels, but at a randomness that suggests an equal probability of rounding toward a farther one of the quantization levels.

* * * * *

UNITED STATES PATENT AND TRADEMARK OFFICE
CERTIFICATE OF CORRECTION

PATENT NO. : 6,671,407 B1  Page 1 of 1
DATED : December 30, 2003
INVENTOR(S) : Venkatesan et al.

It is certified that error appears in the above-identified patent and that said Letters Patent is hereby corrected as shown below:

Title page,
Item [56], References Cited, U.S. PATENT DOCUMENTS, add the following:
-- 5,687,236  11/1997  Moskowitz et al. --.; also
OTHER PUBLICATIONS, add the following:
-- Venkatesan, et al., "Robust Image Hashing"; Cryptography group, Microsoft Research 3 pages. --; and add
-- Malvar; "A Modulated Complex lapped Transform and its Applications to audio Processing," IEEE ICASSP, 99, Phoenix, Arizona, March 1999, pp. 1-4. --.

Column 8,
Line 60, replace "bash" between "mediate" and "values" with -- hash --.

Column 11,
Line 10, replace "Image" between "the" and "into" with -- image --.
Line 54, replace "Image" between "digital" and "using" with -- image --.
Line 54, replace "In" between "using" and "part" with -- in --.

Column 12,
Line 6, replace "files," between "mulitple" and "each" with -- tiles, --.

Signed and Sealed this

Thirteenth Day of April, 2004

JON W. DUDAS
*Acting Director of the United States Patent and Trademark Office*